US005347102A

United States Patent [19]

Kikuchi et al.

[11] Patent Number: 5,347,102

[45] Date of Patent: Sep. 13, 1994

[54] HEATING DEVICE USED FOR PRODUCTION OF SHUTTER FOR A DISK CASSETTE

[75] Inventors: Shuichi Kikuchi, Miyagi; Toshiro Kobayashi, Kanagawa, both of Japan

[73] Assignee: Sony Corporation, Shinagawa, Japan

[21] Appl. No.: 31,554

[22] Filed: Mar. 15, 1993

Related U.S. Application Data

[62] Division of Ser. No. 765,559, Sep. 26, 1991, Pat. No. 5,262,917.

[30] Foreign Application Priority Data

Oct. 1, 1990 [JP] Japan .................................. 2-263347

[51] Int. Cl.[5] .............................................. B29C 17/04

[52] U.S. Cl. ........................... 219/243; 264/DIG. 46; 264/346; 425/DIG. 13

[58] Field of Search ............... 219/243; 264/DIG. 46, 264/327, 296, 346; 425/407, DIG. 13; 100/93 P; 206/444; 360/133

[56] References Cited

U.S. PATENT DOCUMENTS 4,698,714 10/1987 Sugawara et al. .
5,036,421 7/1991 Kaneda et al. .
5,136,449 8/1992 Veenstra .

*Primary Examiner*—Bruce A. Reynolds
*Assistant Examiner*—John A. Jeffery
*Attorney, Agent, or Firm*—W. Patrick Bengtsson

[57] ABSTRACT

A heating device used for production of a disc shutter made of synthetic resin and shaped into a U-form in section, arranged to heat a pair of corner portions of the shutter to extinguish residual stresses that exist in the corner portions that are formed where a connecting portion of the shutter connects a pair of shutter plates. The heating device comprises a movable support for fixedly supporting the free ends of the pair of shutter plates, a fixed heater which heats the corner portions of the shutter at a predetermined temperature, a pair of heating surfaces connected to form an acute angle, a temperature setting device, and a heating duration setting device.

7 Claims, 7 Drawing Sheets

HEATING DEVICE USED FOR PRODUCTION OF SHUTTER FOR A DISK CASSETTE

This is a divisional of application Ser. No. 07/765,559, filed Sep. 26, 1991 now U.S. Pat. No. 5,262,917.

BACKGROUND OF THE INVENTION

1. Field of the Invention

This invention relates generally to a shutter for a disk cassette, and particularly, a shutter to be most applicable to a floppy disk cassette and made of synthetic resin, and also, relates to a heating device used for a production of the same.

2. Description of the Related Art

As disclosed, for example, in U.S. Pat. No. 4,698,714, a disk cassette, such as a floppy disk cassette has a flat square case 3 made of synthetic resin, which comprises an upper half 1 and a lower half 2 as illustrated in FIGS. 7–9. Within the case 3, a disk-like recording medium, such as a floppy disk 4 is rotatably accommodated. Near the front side *3a* of the case 3, the upper half 1 and the lower half 2 have respective rectangular head insertion openings 5 paired with each other. Further, at the center of the lower half 2, a circular turntable insertion opening 6 is provided.

A shutter 9 comprising a pair of upper and lower rectangular shutter plates 8 and a connecting plate for joining the plates 8, and being shaped into a U-form in section is slidably secured to cover a part, near to the front side *3a*, of the case 3. In the event, the upper and lower shutter plates 8 are fitted in respective stepped portions 10 formed in the outer surfaces of the upper half 1 and the lower half 2, and is arranged in parallel with the respective surfaces of the upper half 1 and the lower half 2. The connecting plate 7 is also arranged in parallel with the front side *3a* of the case 3, and the shutter 9 is movable in a direction of arrows a, b along the front side *3a* between its shut position indicated in solid lines and its open position indicated in dot-dash lines in FIG. 7.

When the shutter 9 is moved into the shut position, rectangular openings 11 disposed in the respective upper and lower shutter plates 8 are not coincident with the respective head insertion openings 5 at all, so that the pair of head insertion openings 5 are closed, and when the shutter 9 is moved into the open position, the pair of openings 11 of the shutter 9 are coincident with the respective head insertion openings 5, so that the pair of head insertion openings 5 are opened. It is noted that the shutter 9 has been resiliently biased into the shut position along the direction of arrow a by the force of a spring (not shown).

There are two kinds of shutters 9, one is made of a stainless steel sheet by the help of press working, and the other is made of synthetic resin. Further, there are two kinds of production methods to make the shutter 9 of the synthetic resin.

One method of .producing the shutter 9 of the synthetic resin is such that a synthetic resin plate 13 having a thickness T of less than 0.3 mm and made of polypropylene, vinylchloride or the like is press-worked, then horizontally mounted on a first jig 14 as shown in FIG. 5A, and after sandwiching the central portion of the plate 13 between the first jig 14 and a heated second jig 15, both the end portions of the plate 13 are bent in a direction of arrow c with a pair of third jigs 16 as shown in FIG. 5B in order to obtain a shutter that is of U-shape in section.

The other one method of producing the shutter 9 of the synthetic resin is such that a molten synthetic resin, such as polyacetal, polypropylene, polyethylene or the like is injected into a U-shaped cavity 19 through an injection gate 20 shown in FIG. 6 to make a shutter that is of U-shape in section. It is noted that the cavity 19 is formed between metallic molds 17, 18 and has a gap G of less than 0.3 mm.

However, if the shutter 9 is made by means of bending the synthetic resin sheet 13 while the synthetic resin sheet 13 is heated, residual stresses are produced, after bending, in corners *9a* shown in FIG. 5B, where the respective shutter plates 8 are connected to the connecting plate 7, because the outer side of the corner *9a* is cooled at high speed, whereas the inner side thereof is cooled at low speed.

If the shutter 9 is made by means of injecting the synthetic resin into the metallic mold 17, 18, residual stresses are also produced in the corners *9a* after molding, because the molten synthetic resin 21 flows at high speed and turns sharply along the corner portion 19*a* of the cavity 19, and further, the molten synthetic resin 21 that filled the corner portion 19*a* can not take much cooling time as compared with the one that filled plain portions 19*b*, 19*c* of the cavity 19.

The residual stresses existing in the corner *9a* of the shutter 9 act as a force for transferring the pair of shutter plates 8 in a direction of arrow d in FIG. 5B, so that if the disk cassette is used at high temperature, the pair of shutter plates 8 of the shutter 9 is easily deformed in the direction of arrow d as indicated in dot-dash lines in FIG. 8. As the result, sometimes the disk cassette is difficult to draw from a recording and/or reproducing apparatus, and sometimes, the shutter drops out of the case 3.

OBJECTS AND SUMMARY OF THE INVENTION

Accordingly, it is an object of the present invention to provide a shutter for a disk cassette in which if a shutter of U-shape in section and made of synthetic resin is deformed due to residual stresses existing in the corner thereof, the amount of the deformation is always very small, so that even if the disk cassette were used in a high temperature, it is possible to prevent the disk cassette from being hardly drawn from a recording and/or reproducing apparatus due to deformation of the shutter, or to prevent the shutter from dropping out of the case of the disk cassette, and as the result, great reliance upon the shutter is expected.

Another object of the invention is to provide a heating device used for a production of a shutter as aforesaid, that is, a shutter hardly to deform if it is used for a long time.

In accordance with one aspect of this invention, in a shutter for a disk cassette having a disk, a case in which the disk is rotatably accommodated, a head insertion opening provided in at least one of the upper and lower surfaces of the case, and a turntable insertion opening provided in the lower surface of the case, the shutter comprising a pair of upper and lower shutter plates for covering the respective upper and lower surfaces of the case so as to be able to open and close the head insertion openings, and a connecting portion for covering the front side of the case to connect one end of one of the shutter plates to one end of the other, and being shaped into a U-form in section when made of synthetic resin, a pair of corner portions where the connecting portion is connected to the other ends of the shutter plates at both ends thereof, respectively, is heated in a predetermined temperature to extinguish residual stresses that exist in the corner portions after the shutter has been made of the synthetic resin, in order to prevent the shutter from deforming in such a manner that the free ends of the pair of shutter plates separate from each other.

In a preferred embodiment of this invention, the shutter of synthetic resin is made by injection molding, or made of a synthetic-resin sheet through a bending process.

In accordance with another aspect of this invention,in a heating device used for a production of a shutter made of synthetic resin and shaped into a U-form in section, and available for heating a pair of corner portions of the shutter to extinguish residual stresses that exist in the corner portions that are formed where a connecting portion of the shutter, which serves to cover the front side of a case in which a disk is rotatably accommodated, connects one to the other of a pair of shutter plates that cover the respective upper and lower surfaces of the case so as to be able to open and close a head insertion opening provided in at least one of the upper and lower surfaces of the case, the heating device comprises support means for fixedly supporting the free ends of the pair of shutter plates, which are in opposed relation to the respective ends to have been connected already to the connecting portion of the shutter; heating means correlatively approaching and engaging the pair of corner portions of the shutter that has been fixedly supported by the support means, in order to heat the corner portions in a predetermined temperature; temperature setting means for setting the predetermined temperature, and heating-duration setting means for setting a heating duration by the heating means. The heating means as described above may be a pair of heating surfaces that form a predetermined angle with each other.

The above, and other objects, features and advantages of this invention, will be apparent from the following detailed description of illustrative embodiments thereof to be read in connection with the accompanying drawings, where like reference numerals identify the same or corresponding parts in the several views.

DETAILED DESCRIPTION OF A PREFERRED EMBODIMENT

Figure 5A:
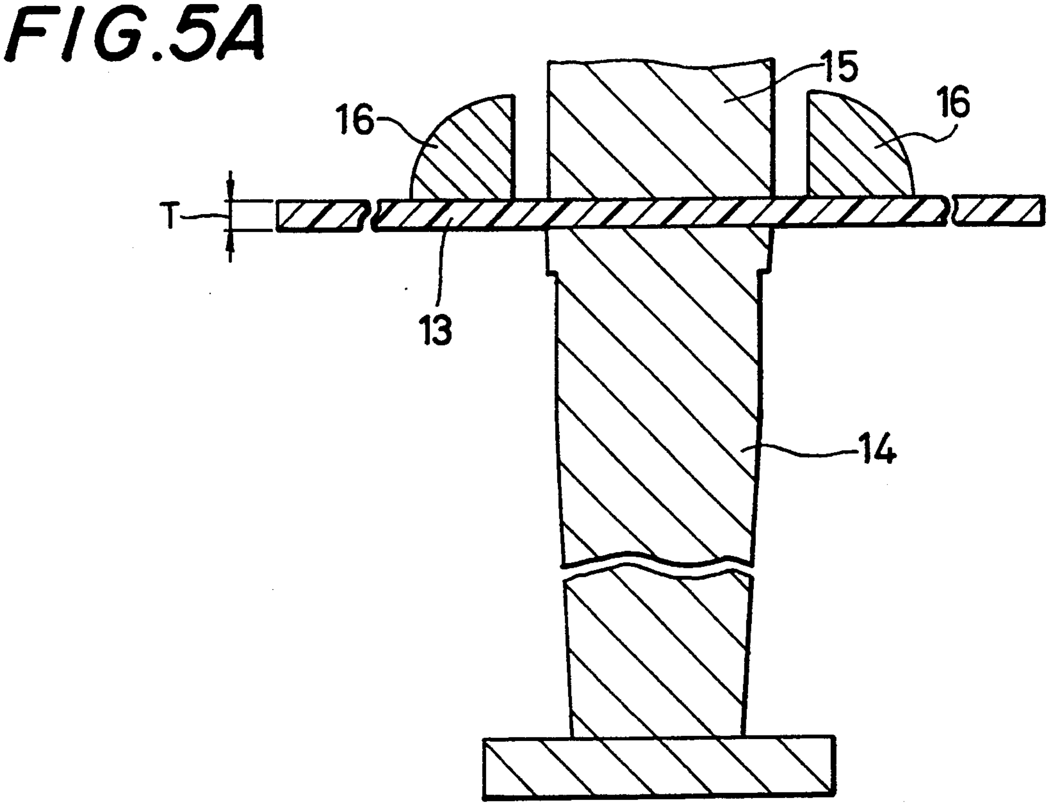
FIGS. 5A and 5B are sectional views illustrating a bending process of a synthetic resin plate to form the shutter of FIG. 1.
Figure 5B:
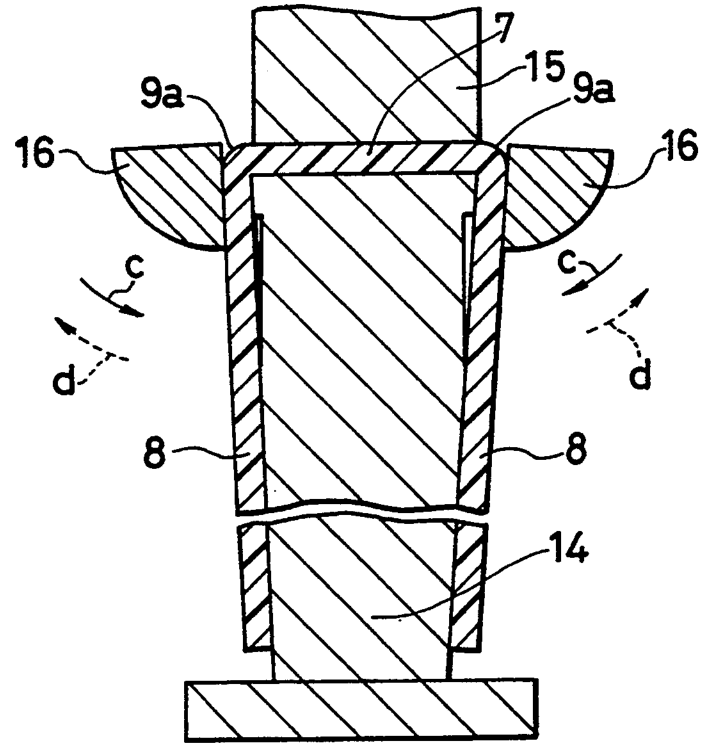
Figure 6:
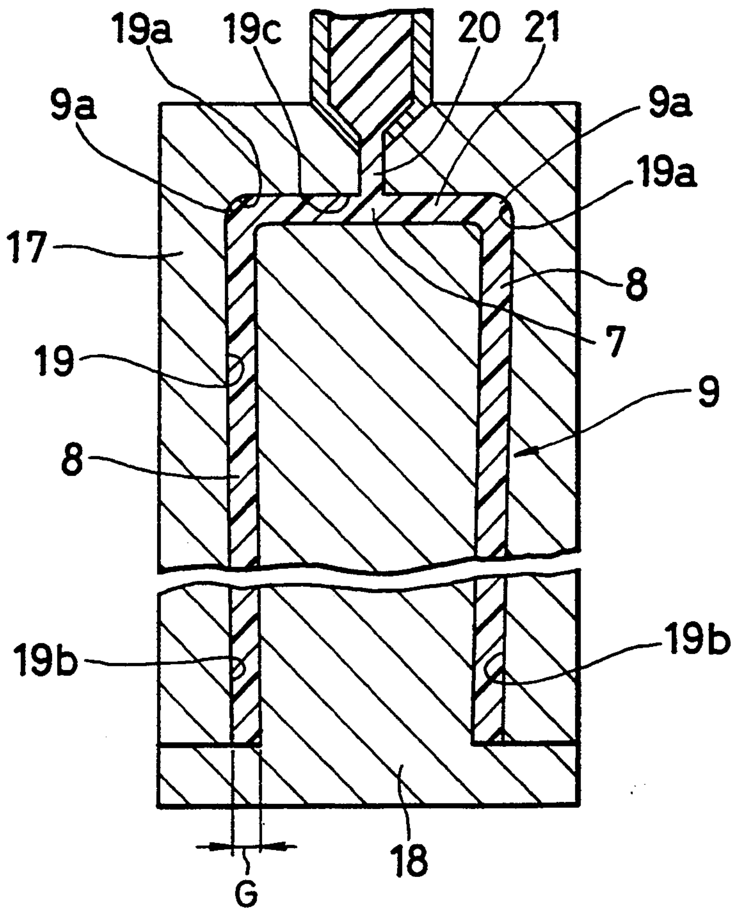
FIG. 6 is a sectional view illustrating a molding process for forming the shutter of FIG. 1.
Figure 9:
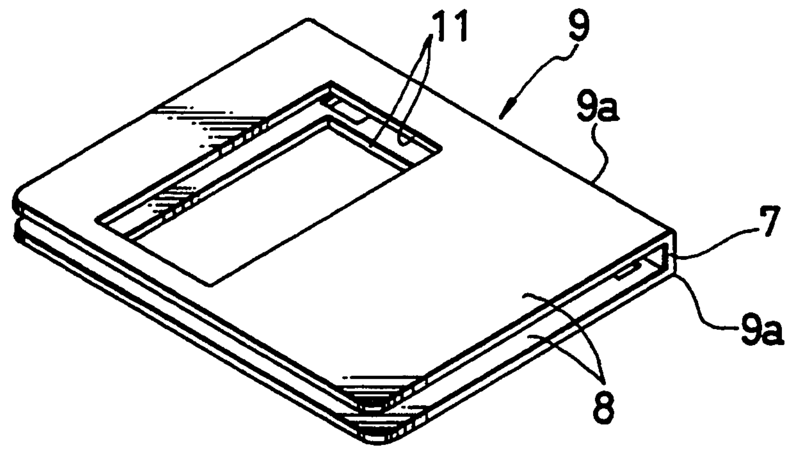
FIG. 9 is a perspective view of the shutter of FIG. 1.

Referring to the drawings, it will be seen that a shutter 9 for a disk cassette embodying the present invention is made as shown in FIGS. 5A and 5B by means of bending a heated synthetic resin sheet 13 to be shaped into a U-form in section, or as shown ih FIG. 6 by means of injecting synthetic resin into a cavity formed with metallic molds 17, 18.

Figure 1:
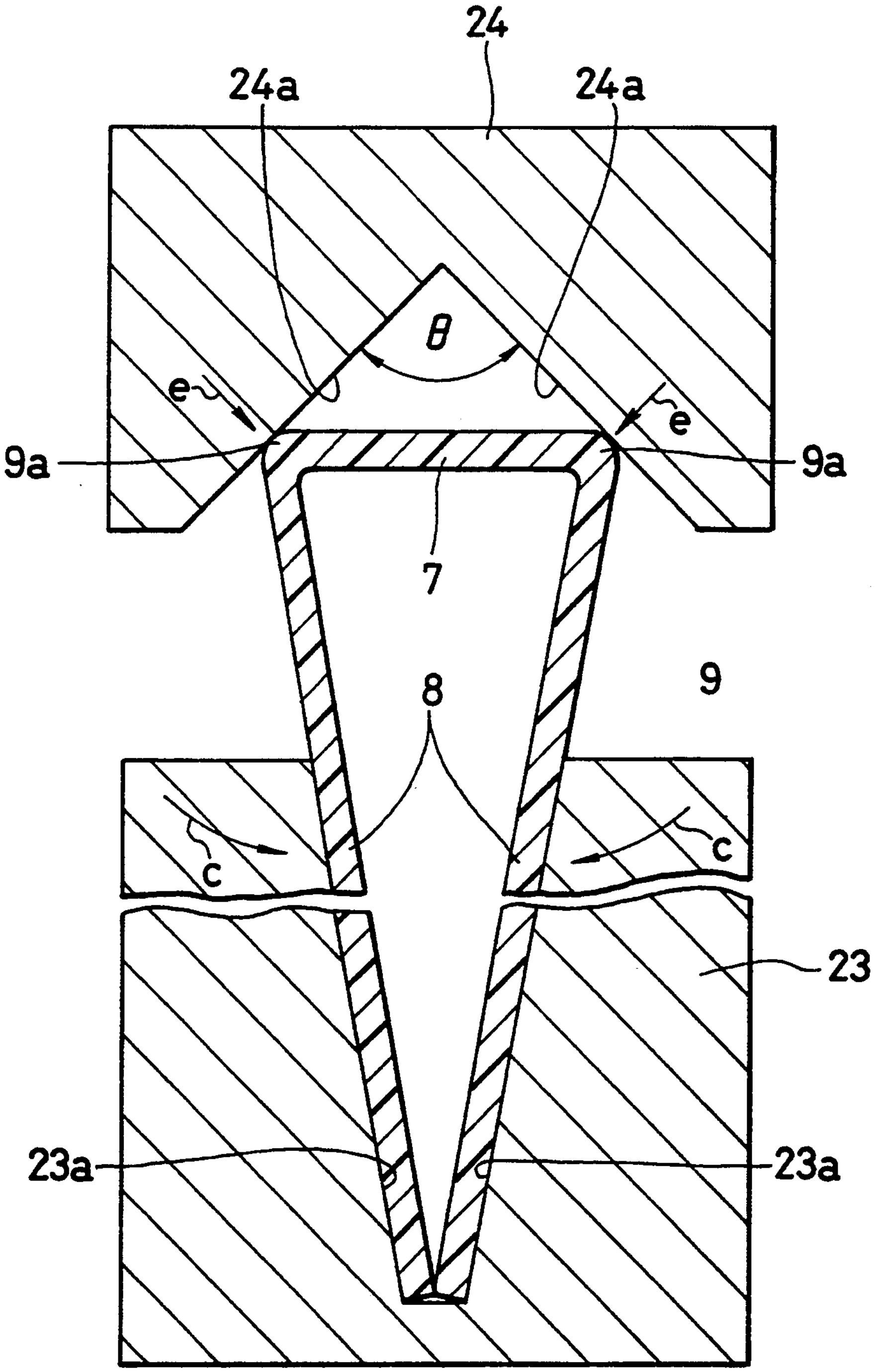
FIG. 1 is a sectional view of a shutter during a heating process, according to an embodiment of this invention.

The shutter 9 thus obtained is inserted into V-shaped groove 23*a* of a jig 23 as shown in FIG. 1 in such a manner that a pair of sides, far from the connecting plate 7, of the shutter plates 8 become ahead thereof, then a pair of heated surfaces 24*a* of a heated jig 24 are lightly pressed against the pair of corners 9*a* of the shutter 9 from a direction of arrow e, and the corners 9*a* are annealed i.e. heated to temperature of 75°–115° C. It is noted that the pair of heated surfaces 24*a* form an angle $\theta$ of 60°–90° with each other.

As the corners 9*a* of the shutter 9 is heated again, the corners 9*a* are softened and at the same time, the residual stresses are extinguished under such a state that the pair of shutter plates 8 make a predetermined angle with each other.

Figure 2:
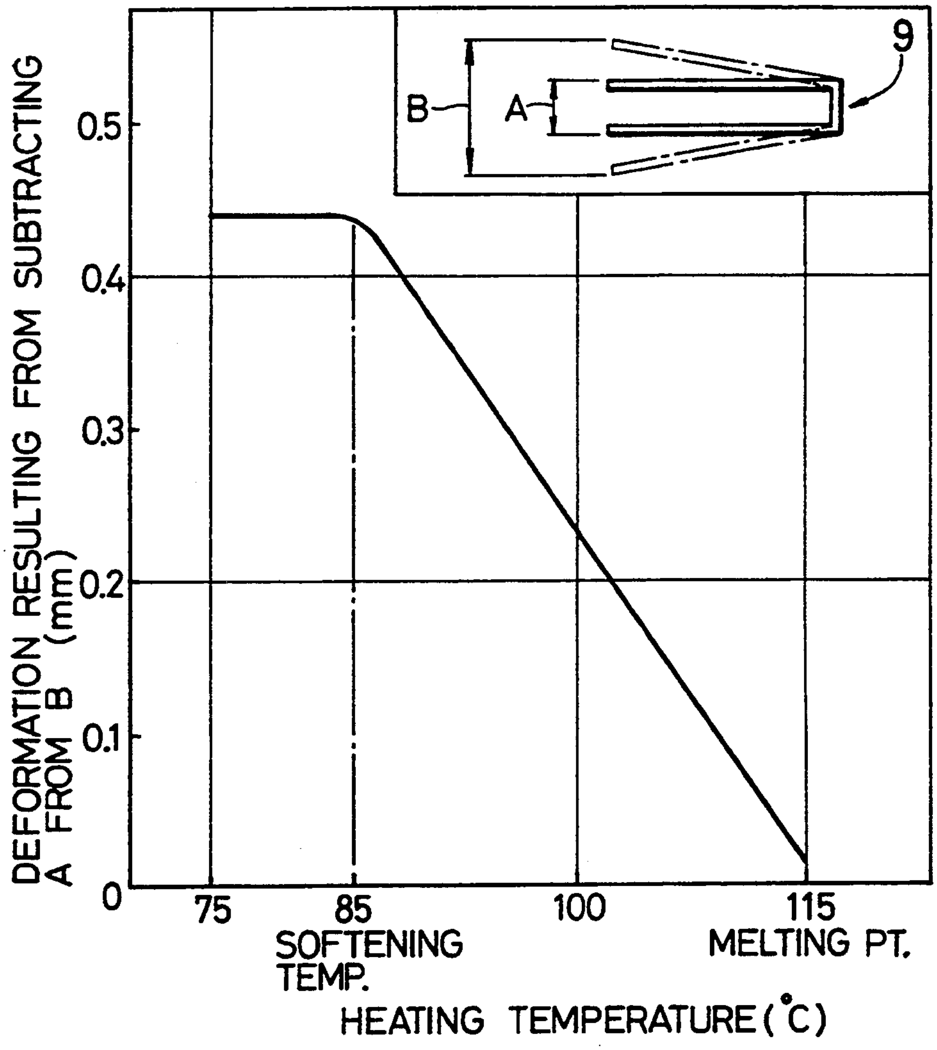
FIG. 2 is a graphical representation of a heating temperature-deformation relationship present in the shutter of FIG. 1.

Shown in FIG. 2 is a relationship between temperatures for the pair of corners 9*a* of the shutter 9 to be exposed and deformations of the shutter 9 when the shutter is kept in a high temperate. When the heating temperature is within a range of 75°–85° C., the deformation hardly changes and is about 0.44 mm, and as the heating temperature is elevated toward 115° C., the deformation gradually decreases and approaches zero.

The temperature of 85° C., in which the deformation is substantially the same as that in less than 85° C., is coincident with the softening temperature of the synthetic resin of which the shutter 9 is made. The softening temperature is settled by a measuring method defined in Japanese Industrial Standard (JIS) K 6734. In this case, the shutter was made of a chloroethylene sheet, and when the shutter 9 is made by injection molding, the temperature of 85° C. should be replaced by a temperature settled by a measuring method defined in ASTM.D. 648.

It is desired that the heating temperature is larger than the temperature settled by the measuring method defined in JIS K 6734 or ASTM.D.648 but should not exceed the fusing point or Vicat point, which is 115° C. in FIG. 2. When the residual stress is rather small, it is sufficient for extinguishing the residual stress if the included angle $\theta$ formed between the pair of heated surfaces 24*a* is 90°, but when the residual stress is large, it is desired for the included angle $\theta$ to be 60°, since it is desirable that the shutter plates 8 are pushed more in the direction of arrow c.

Figure 8:
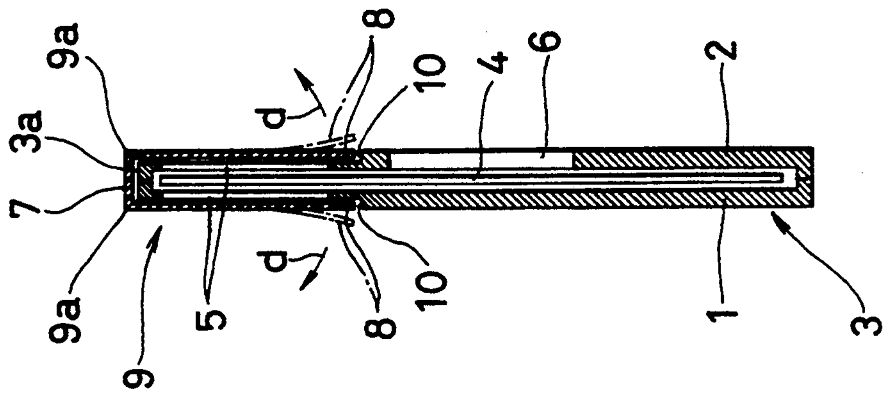
FIG. 8 is a sectional view, viewed along a direction of arrows 8—8, of the disk cassette of FIG. 7.
Figure 7:
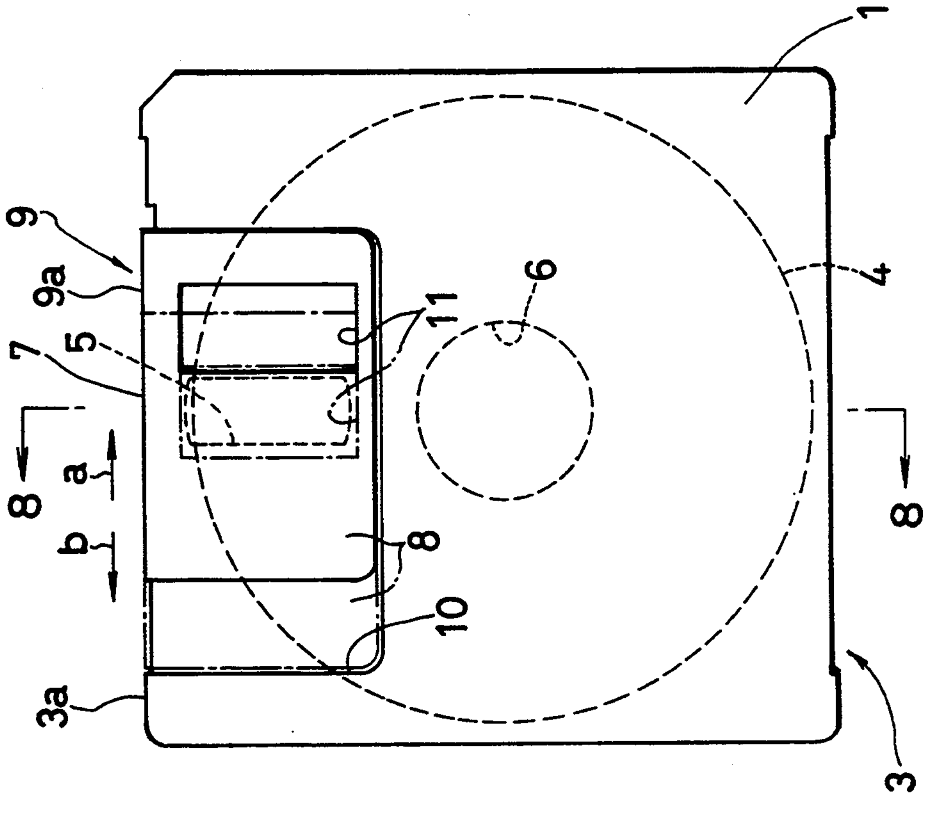
FIG. 7 is a plan view of a disk cassette to which the shutter of FIG. 1 is secured.

As may be seen from the above description, by means of heating the pair of corners 9*a* of the shutter 9 again, it is possible to prevent the pair of shutter plates 8 from transferring in the direction of arrows d to the positions indicated in chain-dotted lines in FIG. 8 even if the shutter 9 were exposed to the high temperature.

Figure 3:
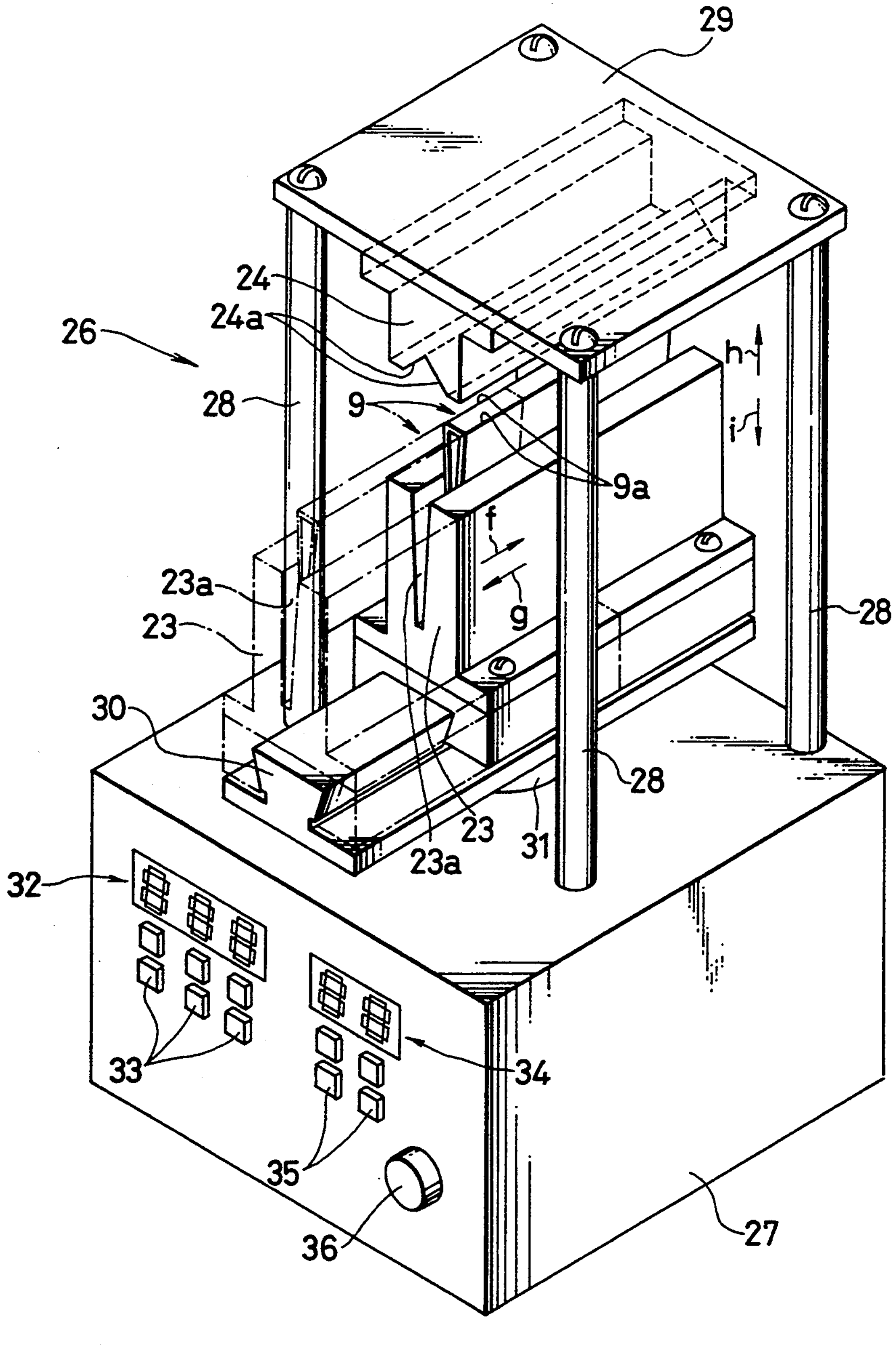
FIG. 3 is a perspective view of a heating apparatus.
Figure 4:
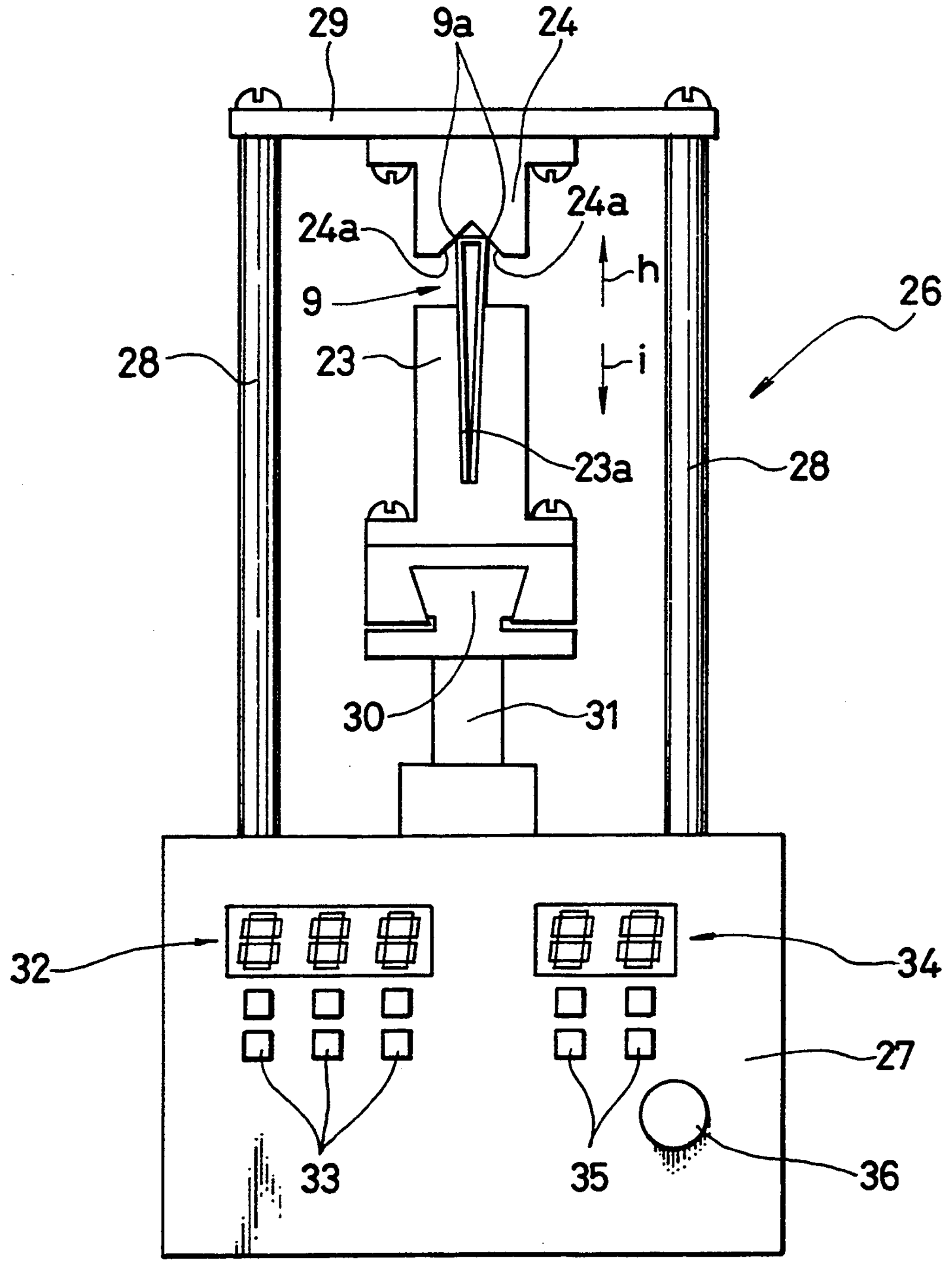
FIG. 4 is a front view of the heating apparatus of FIG. 3.

Shown in FIGS. 3 and 4 is a heating device 26 for heating the corners 9*a* of the shutter 9. A plurality of columns 28 extend upright from a base block 27 of the heating device 26, and a mounting plate 29 is secured to the distal ends of the columns 28. The heated jig 24 is horizontally fixed to the lower surface of the mounting plate 29 so as to face downward.

The jig 23 horizontally arranged under the heated jig 24 is mounted on a horizontal rail 30 so as to be slidable in a direction of arrows f, g, and further, the rail 30 is supported by a lifting device 31 so as to be vertically movable in a direction of arrows h, i. On the base block 27, there are provided heating-temperature displays 24 for displaying the temperature of the heated jig 24, heating-temperature setting switches, heating-duration displays 34, heating-duration setting switches, an operating button and so forth.

After the shutter 9 is inserted into the V-shaped groove 23*a* of the jig 23, the jig 23 is slided in the direction of arrow f on the rail 30 to reach a position just under the heated jig 24. Then, the operating button 3*b* is pushed.

When the heated jig 24 reaches a predetermined temperature, the lifting device 31 is extended and, thereby, the shutter 9 is vertically raised in the direction of arrow h together with the rail 30 and jig 23, so that the pair of corners 9*a* are lightly pressed against the pair of heated surfaces 24*a* of the heated jig 24 for a predetermined duration, respectively.

Thereafter, the lifting device 31 is contracted and, thereby, the jig 23 is lowered in the direction of arrow i together with the rail 30. Then, the jig 23 is slided in the direction of arrow g on the rail 30 in order to pull the shutter 9 out of the groove 23*a* of the jig 23.

Having described illustrative embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

Moreover, this invention is applied not only to the shutter for the floppy disk cassette described in the embodiments but also to shutters for various kinds of disk cassettes accommodating various kinds of recording media, such as hard disk and the like, respectively.

What is claimed is:

1. A heating device for production of a shutter made of synthetic resin and shaped into a U-form in section, the heating device being used for heating a pair of corner portions of the shutter to extinguish residual stresses that exist in the corner portions that are formed where a connecting portion of the shutter connects a pair of shutter plates that cover the respective upper surface and the lower surface of the case so as to be able to open and close a head insertion opening provided in at least one of the upper surface and the lower surface of the case, wherein the heating device comprises:

support means for fixedly supporting the free ends of a pair of shutter plates in a vertical position wherein the free ends, which are in opposed relation to the respective ends that have been already connected to a connecting portion of the shutter, are in contact with each other at a distal position of each free end;

fixed heating means for receiving and contacting only a pair of corner portions of the shutter that have been fixedly supported by said support means, in order to heat said corner portions to a predetermined temperature;

temperature setting means for setting said predetermined temperature; and heating-duration setting means for setting a heating duration by said heating means.

2. A heating device according to claim 4, wherein said heating means has a pair of heating surfaces that connect to form a predetermined acute angle with each other.

3. A heating device according to claim 1, wherein the temperature setting means sets a predetermined temperature of between 75°–115° C.

4. A heating device according to claim 1, wherein the temperature setting means sets a predetermined temperature which is coincident with a softening temperature of the synthetic resin.

5. A heating device according to claim 1, wherein the support means presses the free ends of the shutter plates together so that the shutter plates form an acute angle.

6. A heating device according to claim 1, wherein said support means vertically supports said shutter plates on an outer surface of each shutter plate.

7. A heating device for production of a shutter made of synthetic resin and shaped into a U-form in section, the heating device being used for heating a pair of corner portions of the shutter to extinguish residual stresses that exist in the corner portions that are formed where a connecting portion of the shutter connects a pair of shutter plates that cover the respective upper surface and the lower surface of the case so as to be able to open and close a head insertion opening provided in at least one of the upper surface and the lower surface of the case, wherein the heating device comprises:

support means for fixedly supporting the free ends of a pair of shutter plate in a vertical position wherein the free ends, which are in opposed relation to the respective ends that have been already connected to a connecting portion of the shutter, are in contact with each other at a distal position of each free end, fixed heating means accommodated for receiving and contacting only a pair of corner portions of the shutter that have been fixedly supported by said support means, in order to heat said corner portions to a predetermined temperature;

temperature setting means for setting said predetermined temperature; and heating-duration setting means for setting a heating duration by said heating means, wherein said heating means has a pair of heating surfaces that connect to form a predetermined acute angle with each other, wherein the temperature setting means sets a predetermined temperature which is coincident with a softening temperature of the synthetic resin, and wherein the support means presses the free ends of the shutter plates together so that the shutter plates form an acute angle.

* * * * *